United States Patent
Ito

[15] 3,698,263
[45] Oct. 17, 1972

[54] BALANCING APPARATUS FOR A ROTATING BODY

[72] Inventor: Teruyuki Ito, Aichi, Japan

[73] Assignee: Toyoda Koki Kabushiki Kaisha, Kariya-shi, Japan

[22] Filed: June 25, 1971

[21] Appl. No.: 156,803

[30] Foreign Application Priority Data

June 30, 1970 Japan..................45/57157

[52] U.S. Cl........................................74/573, 51/169
[51] Int. Cl..................................................F16f 15/22
[58] Field of Search..........................74/573; 51/169

[56] References Cited

UNITED STATES PATENTS 2,915,918  12/1959  Comstock et al............74/573
3,371,450  3/1968  Board, Jr. et al............51/169

Primary Examiner—William F. O'Dea
Assistant Examiner—F. D. Shoemaker
Attorney—Oblon, Fisher & Spivak

[57] ABSTRACT

A balancing apparatus for a rotating body mounted on a spindle comprises a support for first and second motors being rotatably disposed on the spindle, the motors being secured on the support at diametrically opposed points relative to the spindle axis, and first and second balancing weights mounted on the support and being rotatable in annular paths thereon concentric to the spindle axis. Transmission gearing is provided for permitting the first motor to drive itself and the support thereof for rotating the support about the spindle axis and for permitting the second motor to rotate the balancing weights toward and away from each other in the annular paths of travel thereof.

6 Claims, 5 Drawing Figures

PATENTED OCT 17 1972

INVENTOR
TERUYUKI ITO

BY Oblon, Fisher & Spivak
ATTORNEYS

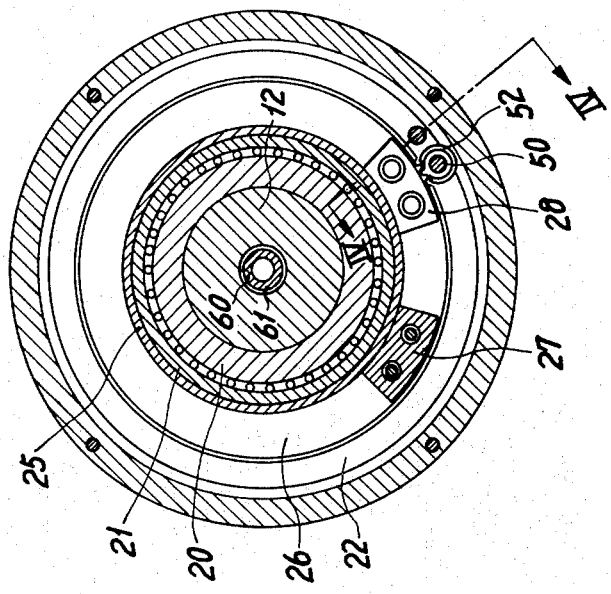
Fig. 3
Fig. 4
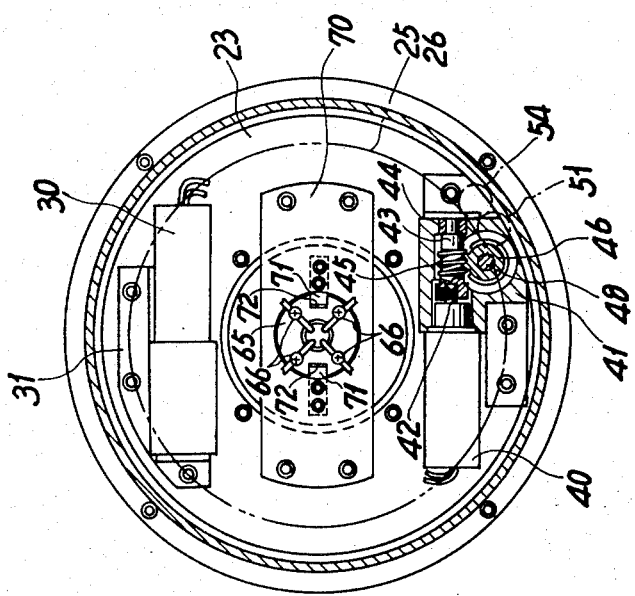
Fig. 2

BALANCING APPARATUS FOR A ROTATING BODY

BACKGROUND OF THE INVENTION

This invention relates generally to dynamically actuated balancing apparatus and more particularly pertains to a dynamically actuated balancing apparatus for a rotating body, such as a grinding wheel, selectively operable while the rotating body to be balanced in being rotated about a predetermined axis.

Heretofore, balancing apparatus have been provided for rotating bodies wherein two or more balancing weights positioned thereon are adjusted either automatically or manually so that a resultant force of the balancing weights is equal in magnitude to the resultant unbalancing force. In such balancing apparatus, it is necessary to provide a clamping device for holding the balancing weights in adjusted relation and which is selectively actuable by external means. Such arrangements connecting the external means to the rotating clamping device constitute complex structural configurations and are effective to weaken the stiffness of the spindle.

In further prior art treatment of this problem, a balancing apparatus is known wherein rotating bodies are provided with two stepping motors which serve as balancing weights and also are operative to rotate themselves in the same or in counter directions about a spindle axis upon energization thereof. After completion of a balancing adjustment, the stepping motors are maintained energized so as to be held in the proper angularly adjusted position. The balancing weights preferably should be within the same general weight range relative to an imbalance to be corrected in order to easily and accurately compensate for the imbalance. However, because the motors being used as balancing weights are generally larger in weight in comparison with the imbalance in these cases, an allowable range for the angular adjustment thereof is very restricted. Accordingly, it is difficult to easily find a balanced position wherein the resultant force of these motors is equal in magnitude to the resultant unbalancing force present, such as, for example, in grinding wheels.

SUMMARY OF THE INVENTION

It is therefore an object of the present invention to provide an improved dynamically actuated balancing apparatus for balancing a rotating body.

Another object of the present invention is the provision of an improved balancing apparatus for balancing a rotating body having a pair of balancing weights which are in substantially the same weight range as the imbalance to be corrected and are automatically angularly adjustable about the axis of rotation in both phase and magnitude.

Still another object of this invention is to provide an improved balancing apparatus for rotating bodies of the type characterized by motor-driven balancing weights angularly adjustable in both phase and magnitude, wherein the balancing weights are in the same weight range as the possible imbalance of the rotating body.

The foregoing and other objects are attained in accordance with this invention by rotatably mounting a support for a pair of diametrically opposed motors mounted thereon for rotation about the axis of the rotating body, such as, for example, the spindle axis of a grinding wheel, the imbalance of which is to be corrected, mounting a pair of balancing weights being in the same general weight range as usual imbalances of such wheels on the motor support for rotation in annular paths thereon, and providing transmission arrangements for connecting one of the motors with the mounting means of the grinding wheel spindle for permitting the motor to drive the motor support and the balancing weights thereon about the spindle axis and for connecting the other of the motors with the balancing weights for driving the weights toward and away from each other along the prescribed annular paths of rotation thereof. Thus, an angular adjustment of the balancing weights is obtained respectively in phase as well as magnitude. In addition, the motors herein serve as clamping means for the balancing weights because they remain in the adjusted positions upon de-energization of the motors, even if a centrifugal force is applied on the weights.

BRIEF DESCRIPTION OF THE DRAWINGS

Other objects, features and attendant advantages of the present invention will be more fully appreciated as the same becomes better understood from the following detailed description when considered in connection with the accompanying drawings, in which like reference numerals designate like or corresponding parts throughout the several views, and wherein:

FIG. 2 is a cross-sectional view of the balancing means taken on the line II—II of FIG. 1;

FIG. 3 is a cross-sectional view taken on the line III—III of FIG. 1;

FIG. 4 is a cross-sectional view taken on the line IV—IV of FIG. 3; and

DETAILED DESCRIPTION OF A PREFERRED EMBODIMENT

Figure 5:
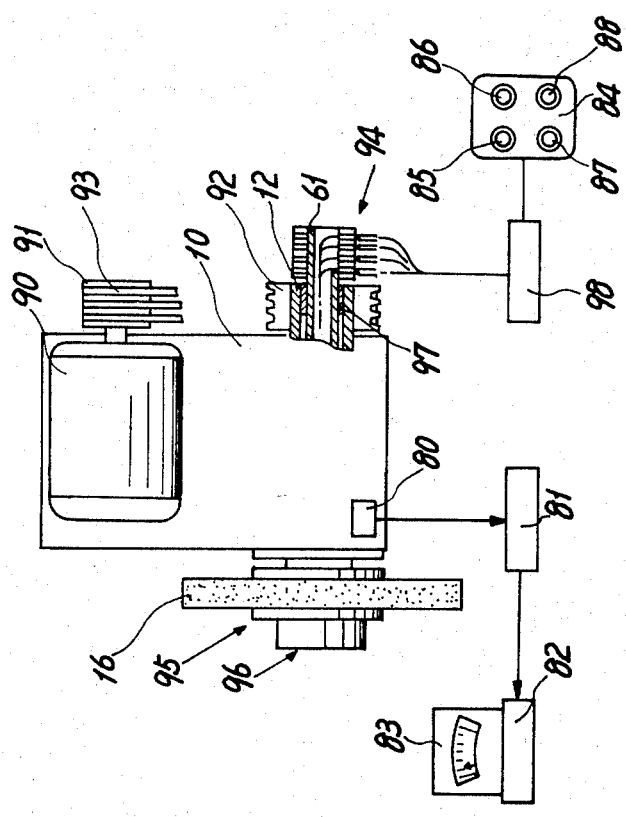
FIG. 5 is a plan view of a wheel head provided with the balancing apparatus according to the present invention and schematically illustrating a control thereof.

Referring now to the drawings, and more particularly to FIG. 5, a wheel head 10 is mounted on a base, not shown, and supports thereon a drive motor 90 provided with a drive sheave 91 interconnected with a spindle sheave 92 through a plurality of drive belts 93.

An elongated wheel spindle 12 projecting at both ends from the wheel head 10 supports the spindle sheave 92 at one end thereof and a wheel sleeve assembly 95 on the other end. The wheel sleeve assembly 95 carries a grinding wheel 16 and a dynamically actuated balancing apparatus 96 described in further detail hereinbelow.

Figure 1:
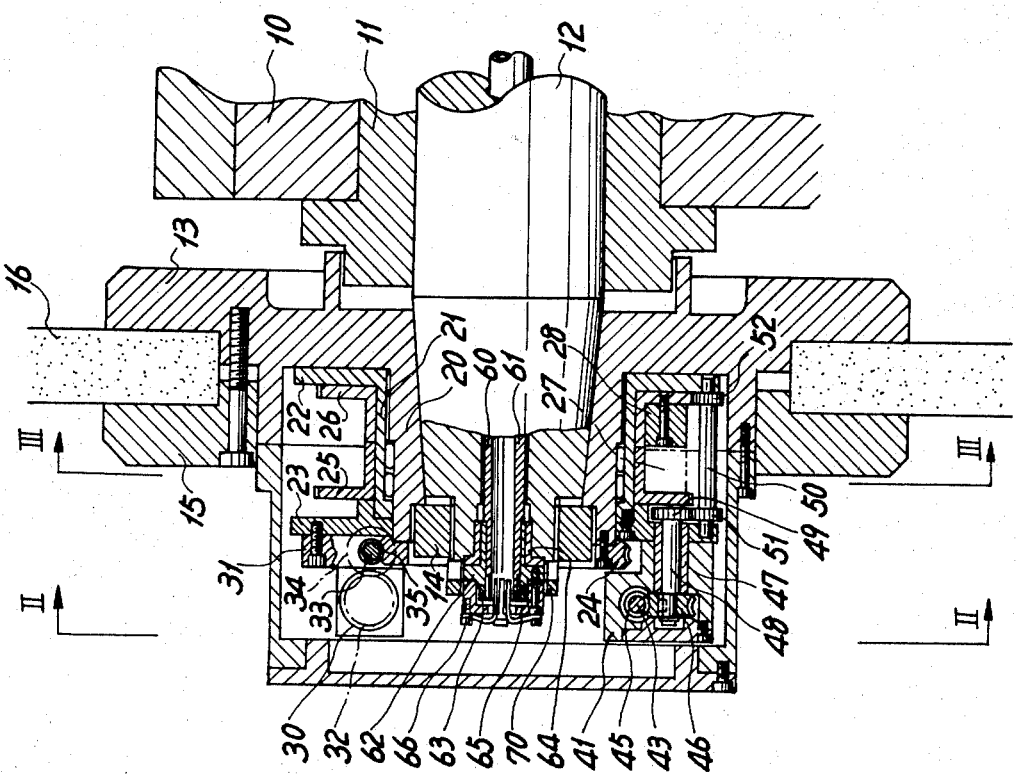
FIG. 1 is a cross-sectional view of a balancing apparatus according to this invention.

Referring now to FIG. 1, the wheel spindle 12 is rotatably mounted in the wheel head 10 by bearing sleeves 11 secured therein. The spindle is provided at its left end, as seen in FIG. 1, with a wheel sleeve 13 secured thereto by a retaining nut 14. The wheel sleeve 13 is cooperatively associated with a flange member 15 to clamp the grinding wheel 16 therebetween by means of bolts and the grinding wheel thus secured is thereby driven by the drive motor 90.

The wheel sleeve 13 is provided with an axially extending annular reduced portion 20 on the outer periphery of which is mounted a rotatable support member 21, such as on needle roller bearings. An integral flange 22 formed on the rotatable support member 21 extends radially therefrom at the right end thereof and a circular flange plate 23 is bolted thereto at the left end. A worm wheel 24 is fixed on the left end face of the annular portion 20 in concentric relation with the wheel spindle 12 being in contact with the left end of the circular plate 23 for axially retaining the circular plate 23 and the support member 21.

A pair of ring gears 25 and 26 are rotatably mounted on the outer periphery of the support member 21 in axially spaced relation so as to travel in respectively spaced annular paths. Secured to the ring gears 25 and 26 are a pair of segmentally formed balancing weights 27 and 28 each having the same weights.

For adjusting the balancing weights, a pair of motors 30 and 40 are respectively mounted on support blocks 31 and 41 secured on the left end surface of the circular plate 23. The motors 30 and 40 are arranged at diametrically opposed positions relative to the axis of the spindle 12 and are arranged in such a manner that the drive shafts thereof are disposed in tangential relation to the wheel spindle 12.

Motor 30 is provided with a pinion 32 keyed to the drive shaft thereof. The pinion 32 engages another pinion 34 mounted on a worm shaft 33 which is rotatably supported by suitable bearings in the support block 31, not shown, the worm shaft 33 being provided with a worm 35 engaging the worm wheel 24 secured to the wheel sleeve 13.

When the motor 30 is energized, it will rotate in predetermined directions and drive itself around the worm wheel 24 and thus around the rotary axis of the wheel spindle 12 through the pinions 32,34 and worm 35. Therefore, with the rotation of the motor 30, the support block 31, the circular plate 23 and all other parts mounted thereon are also rotated. The transmission means includes a worm gearing consisting of the worm 35 and the worm wheel 24, and accordingly is nonreversible and is operable only when the motor 30 is energized.

In the support block 41, a worm shaft 43 provided with a worm 45 is secured by a set-screw to a drive shaft 42 of the second motor 40, as shown in FIG. 2, and is rotatably supported by a bearing 44 arranged therein. A worm wheel 46 meshing with the worm 45 is keyed at one end of a worm wheel shaft 48 rotatably supported in parallel relation with the spindle axis by a bearing 47 in the support block 41 and extending through the circular plate 23. The worm wheel shaft 48 is provided with a pinion 49 at the other end thereof which engages a pinion 51 mounted on one end of a pinion shaft 50 rotatably supported by both the circular plate 23 and the flange 22. Another pinion 52 at the other end of the pinion shaft 50 engages with the second ring gear 26 carrying the second balancing weight 28.

Another pinion shaft 53 is rotatably supported in parallel relation with the pinion shaft 50 also being carried by both the circular plate 23 the flange 22 as shown in FIG. 4, and has a long pinion 54 which engages both the pinion 51 and the ring gear 25 having the balancing weight 27 thereon.

Therefore, when the second motor 40 is energized, it rotates in predetermined directions and drives the worm 45, the worm wheel 46, pinions 49,51,52 52 and 54. Accordingly, the balancing weights 27 and 28 are rotatable towards and away from each other on the outer periphery of the support member 21. This second transmission means includes a worm gearing consisting of the worm 45 and the worm wheel 46. As in the other transmission, it is nonreversible and is operable only when the second motor 40 is energized.

All parts on the circular plate 23 including the motors 30 and 40, the support blocks 31 and 41 and the transmissions are balanced relative to the spindle axis.

The wheel spindle 12 is further provided with a central through bore 60, as shown best in FIG. 3, to receive a tube 61 rotatably mounted in the wheel spindle 12 at opposite ends thereof by bearing sleeves 64 and 97. At the left end of the tube 61, FIG. 1, there is provided a bushing 62 fixed thereto by a nut 63. The bushing 62 is covered by a cap 65 made of a suitable insulating material and being provided with a plurality of connectors 66. As shown in FIG. 5, the tube supports at the right end thereof a slip-ring assembly 94, in a manner well known to those skilled in the art. The connectors 66 support leads serving to connect the motors 30 and 40 with a power source, not shown, through the tube 61 and the slip-ring assembly 94.

As shown in FIG. 2, a drive plate 70 is secured to the circular plate 23 by bolts and is provided with keys 71 projecting from the inner part thereof. In turn, the cap 65 is held against rotation relative to the drive plate 70 by engagement of keyways 72 with keys 71. Thereby, when the first motor 30 is energized, the tube 61 and the cap 65 are rotated therewith and the relative arrangement between the various connectors 66 on the cap and the first motor is maintained constant.

An operating control system for motors 30 and 40 is schematically illustrated in FIG. 5. A vibration transducer 80 mounted on the wheel head 10 serves to detect any vibrations set up by an unbalance of the rotating bodies and to convert such into electric signals. An amplifier 81 amplifies the output of the transducer 80 and supplies a direct current voltage of a magnitude proportional to the degree of unbalance to an indicating device 82 to indicate the unbalance on a meter 83. A control panel 84 is connected with the slip-ring assembly 94 through an electric circuit 98 including an electric power source and is provided with push buttons 85,86,87 and 88. The push buttons 85 and 86 serve to energize the motor 30 for rotating it, respectively, clockwise and counterclockwise about the wheel spindle axis. The push buttons 87 and 88 serve to rotate the other motor 40, respectively, clockwise and counterclockwise to rotate the balancing weights 27 and 28, respectively, toward and away from each other, as best illustrated in FIG. 3.

In operation, when the wheel drive motor 90 is energized, the wheel spindle 12 holding the grinding wheel 16 is rotated. As a result, a vibration is generated according to the degree of unbalance of the rotating bodies including the grinding wheel 16. The magnitude or the amplitude of the vibration is detected in the vibration transducer 80 and is indicated in the indicating device 82 through the amplifier 81.

At first, an operator will continue to depress the push button 85 to cause the first motor 30 to rotate around the spindle axis. That is, the first motor 30 drives itself clockwise, as viewed in FIG. 2, about the worm wheel 24 and about the axis of the wheel spindle 12 so as to revolve the system, including the balancing weights 27 and 28 supported on the circular plate 23 and the movable support 21. If the operator notes that the amplitude of the vibration is increasing, he ceases immediately from depressing the push button 85 and instead depresses the other push button 86 to reverse the rotation of the first motor until a minimum vibration level or amplitude is noted.

In the next step, he will continue to depress the push button 87 or 88 to rotate the second motor about its axis. According to this rotation, the balancing weights are rotated towards or away from each other by the same angle of displacement. If the amplitude of the vibration is increasing, the one push button 87 or 88 is released and the other is depressed to reverse the travelling direction of the balancing weights until a minimum vibration level less than the first such level provided in the first step is noted.

As previously mentioned, the present balancing device includes the first motor 30 for changing in phase the balancing weights so that the resultant unbalancing force acts along a line bisecting the angle between the balancing weights, and further includes the second motor 40 for changing the angle between the balancing weights in equal increments from the acting line of the unbalancing force so that the resultant force of the balancing weights is equal in magnitude to the resultant unbalancing force.

Obviously, many modifications and variations of the present invention are possible in light of the teachings of this invention. It is to be understood, therefore, that within the scope of the appended claims, the invention may be practiced otherwise than as specifically set forth herein.

What is claimed as new and desired to be secured by Letters Patent of the United States is:

1. In a device having means for rotatably mounting a body on a spindle, a balancing apparatus for the rotating body comprising:
   support means rotatably disposed on said body mounting means for rotation about the axis of said spindle;
   first and second motors mounted on said support means at diametrically opposed positions relative to the spindle axis;
   first and second balancing weights mounted on said support means and being rotatable thereon in annular paths concentric to said spindle axis;
   first transmission means connecting said first motor with said body mounting means for permitting said first motor to rotate said support means thereof about said body mounting means; and
   second transmission means connecting said second motor with said first and second balancing weights for permitting said second motor to move said first and second balancing weights toward and away from each other along said annular paths.

2. A balancing apparatus according to claim 1, further comprising means for connecting said motors through said spindle to a power source.

3. A balancing apparatus according to claim 2, wherein said means for connecting said motors to a power source comprises:
   a tabular member extending through said spindle in rotatable relation therewith and being restrained against rotation relative to said support means at one end thereof; and
   a slip-ring assembly mounted on the other end of said tube connected through said tube with said motors.

4. A balancing apparatus according to claim 1, wherein:
   said first transmission means includes a first worm wheel secured on said mounting means and a first worm meshingly engaging said first worm wheel and being connected with said first motor; and
   said second transmission means includes a second worm connected with said second motor and
   a second worm wheel meshingly engaging said second worm and being operably connected with said first and second balancing weights.

5. A balancing apparatus according to claim 4, wherein said second worm wheel is connected with one of said balancing weights through a drive pinion connected with said second worm wheel and a driven pinion meshing therewith, and is connected with the other of said balancing weights through a third pinion engaging said driven pinion.

6. A balancing apparatus according to claim 4, wherein each of said first and second balancing weights includes a ring gear and a segment weight thereon, said segment weights being axially spaced from each other on said spindle axis.

* * * * *